US012736362B2

(12) United States Patent
Nakamura et al.

(10) Patent No.: US 12,736,362 B2
(45) Date of Patent: Sep. 15, 2026

(54) IMAGE CONTROL METHOD AND IMAGE CONTROL DEVICE

(71) Applicant: Nissan Motor Co., Ltd., Yokohama (JP)

(72) Inventors: Shohei Nakamura, Kanagawa (JP); Yohei Taniguchi, Kanagawa (JP); Masashi Horibe, Kanagawa (JP); Kenji Maeda, Kanagawa (JP); Midori Isobe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 187 days.

(21) Appl. No.: 18/565,059

(22) PCT Filed: May 31, 2021

(86) PCT No.: PCT/JP2021/020660
§ 371 (c)(1),
(2) Date: Nov. 28, 2023

(87) PCT Pub. No.: WO2022/254509
PCT Pub. Date: Dec. 8, 2022

(65) Prior Publication Data
US 2024/0263955 A1 Aug. 8, 2024

(51) Int. Cl.
*B60W 30/18* (2012.01)
*B60W 50/14* (2020.01)
(Continued)

(52) U.S. Cl.
CPC ... *G01C 21/3602* (2013.01); *B60W 30/18163* (2013.01); *B60W 50/14* (2013.01);
(Continued)

(58) Field of Classification Search
CPC .......... B60W 30/18163; B60W 50/14; B60W 2050/146; B60W 2552/10; B60W 50/082;
(Continued)

(56) References Cited

U.S. PATENT DOCUMENTS 11,105,651 B2 8/2021 Ichinokawa
11,183,069 B2 11/2021 Ikeda et al.
(Continued)

FOREIGN PATENT DOCUMENTS

JP 2008-298457 A 12/2008
JP 2013-130462 A 7/2013
(Continued)

*Primary Examiner* — Hossam M Abd El Latif
(74) *Attorney, Agent, or Firm* — Young Basile Hanlon & MacFarlane. P.C.

(57) ABSTRACT

An image control method includes: generating a road image representing an own lane and other lanes; and generating lane change images by, in a case where the own vehicle is caused to perform a lane change by autonomous travel control, when a target lane determined as a destination lane of a lane change is one of the displayed other lanes, superimposing a first course display representing a course in which a lane change to the target lane included in the displayed other lanes is performed on the road image and, when the target lane is none of the displayed other lanes, superimposing a second course display representing a course in which a lane change from the own lane to one of the displayed other lanes is performed and a lane change to an outer side of the displayed other lanes is further performed on the road image is performed.

7 Claims, 5 Drawing Sheets

(51) Int. Cl.
*G01C 21/36* (2006.01)
*G08G 1/0962* (2006.01)

(52) U.S. Cl.
CPC ... *G01C 21/3676* (2013.01); *B60W 2050/146* (2013.01); *B60W 2552/10* (2020.02)

(58) Field of Classification Search
CPC .............. G08G 1/0962; G01C 21/3602; G01C 21/3676; G01C 21/3658
USPC ............................................................ 701/26
See application file for complete search history.

(56) References Cited

U.S. PATENT DOCUMENTS

| | | | |
|---|---|---|---|
| 2013/0151145 A1 | 6/2013 | Ishikawa | |
| 2017/0210394 A1* | 7/2017 | Yamada | G06F 3/04883 |
| 2019/0152525 A1 | 5/2019 | Resch | |
| 2020/0080864 A1* | 3/2020 | Ichinokawa | B60K 35/28 |
| 2020/0307594 A1* | 10/2020 | Kato | B60W 60/0059 |
| 2020/0312151 A1 | 10/2020 | Ikeda et al. | |
| 2022/0107201 A1 | 4/2022 | Yagyu et al. | |
| 2022/0118983 A1 | 4/2022 | Yagyu et al. | |
| 2024/0336266 A1* | 10/2024 | Hirosawa | B60W 30/18163 |

FOREIGN PATENT DOCUMENTS

| | | | |
|---|---|---|---|
| JP | 2015-011458 | A | 1/2015 |
| JP | 6056682 | B2 * | 1/2017 |
| JP | 2017-068585 | A | 4/2017 |
| JP | 2018-079202 | A | 5/2018 |
| JP | 2020-041916 | A | 3/2020 |
| JP | 2020-163901 | A | 10/2020 |
| JP | 2021-006805 | A | 1/2021 |
| JP | 2021-009133 | A | 1/2021 |
| WO | 2020/261781 | A1 | 12/2020 |
| WO | 2021/002081 | A1 | 1/2021 |

* cited by examiner 16
166
167
162
5
161b
164b
165
163b
163a
SOON, TURN RIGHT AT JUNCTION
WHEN BUTTON IS PRESSED, THIS CAR WILL ADVANCE TO ROAD TO JUNCTION

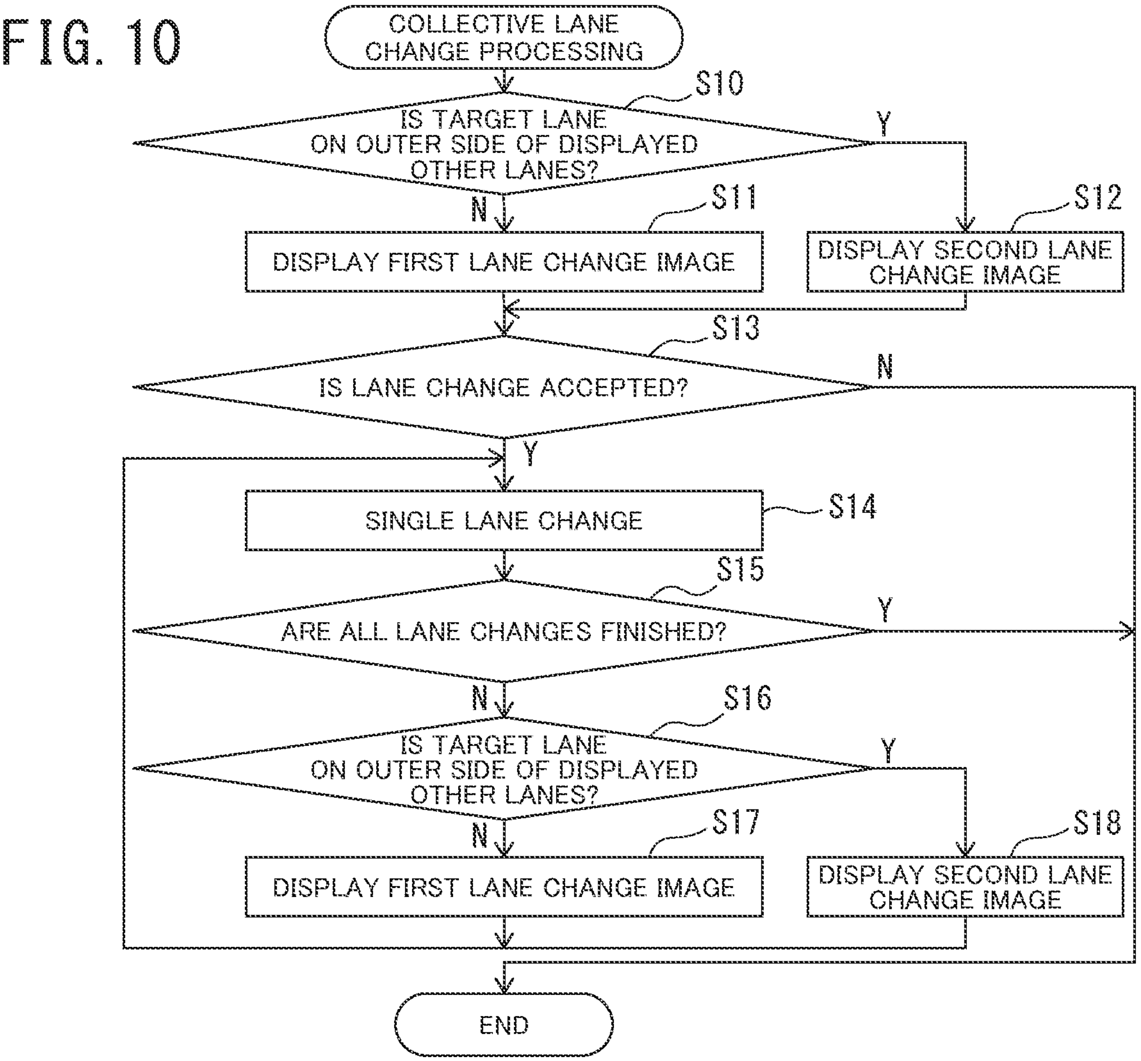

FIG. 10

COLLECTIVE LANE CHANGE PROCESSING
S10
IS TARGET LANE ON OUTER SIDE OF DISPLAYED OTHER LANES?
Y
N
S11
DISPLAY FIRST LANE CHANGE IMAGE
S12
DISPLAY SECOND LANE CHANGE IMAGE
S13
IS LANE CHANGE ACCEPTED?
N
Y
S14
SINGLE LANE CHANGE
S15
ARE ALL LANE CHANGES FINISHED?
Y
N
S16
IS TARGET LANE ON OUTER SIDE OF DISPLAYED OTHER LANES?
Y
N
S17
DISPLAY FIRST LANE CHANGE IMAGE
S18
DISPLAY SECOND LANE CHANGE IMAGE
END

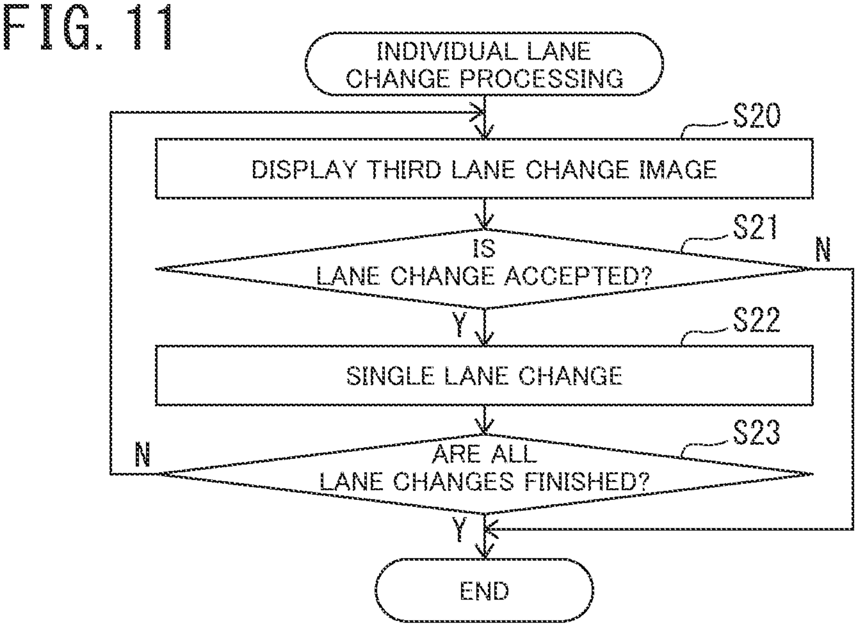

FIG. 11

IMAGE CONTROL METHOD AND IMAGE CONTROL DEVICE

TECHNICAL FIELD

The present invention relates to an image control method and an image control device.

BACKGROUND

In JP 2018-079202 A described below, a display device that, by displaying an arrow extending from the own lane to an adjacent lane in a road image representing the own lane and the adjacent lane, informs that a lane change from the own lane to the adjacent lane is to be performed by autonomous driving is described.

SUMMARY

However, there are some cases that when the own vehicle is caused to perform a lane change by autonomous travel control, the own vehicle is caused to perform a lane change to a lane farther than an adjacent lane by successively performing multiple lane changes. In such a lane change, an image display in JP 2018-079202 A cannot inform a passenger of whether a lane change to an adjacent lane is finally performed or lane changes further continue before start of a lane change.

An object of the present invention is to provide an image display capable of informing whether a lane change to an adjacent lane is finally performed or lane changes further continue before start of a lane change by autonomous travel control.

According to an aspect of the present invention, there is provided an image control method causing a controller to execute processing including: generating a road image representing an own lane, the own lane being a lane in which an own vehicle travels, and one or more other lanes existing on at least one lateral side of the own lane and including at least an adjacent lane, the adjacent lane being adjacent to the own lane; generating a lane change image by, in a case where the own vehicle is caused to perform a lane change by autonomous travel control, when a target lane determined as a destination lane of a lane change is determined to be one of displayed other lanes, the displayed other lanes being the other lanes displayed in the road image, superimposing a first course display representing a course in which a lane change from the own lane to the target lane included in the displayed other lanes is performed on the road image and, when the target lane is determined to be none of the displayed other lanes, superimposing a second course display representing a course in which a lane change from the own lane to one of the displayed other lanes is performed and a lane change to an outer side of the displayed other lanes is further performed on the road image; and displaying the lane change image on a display device.

According to an aspect of the present invention, it is possible to provide an image display capable of informing whether a lane change to an adjacent lane is finally performed or lane changes further continue before start of a lane change by autonomous travel control.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 10 is a flowchart illustrative of an example of collective lane change processing in FIG. 9; and FIG. 11 is a flowchart illustrative of an example of individual lane change processing in FIG. 9.

DETAILED DESCRIPTION (Configuration)

Figure 1:
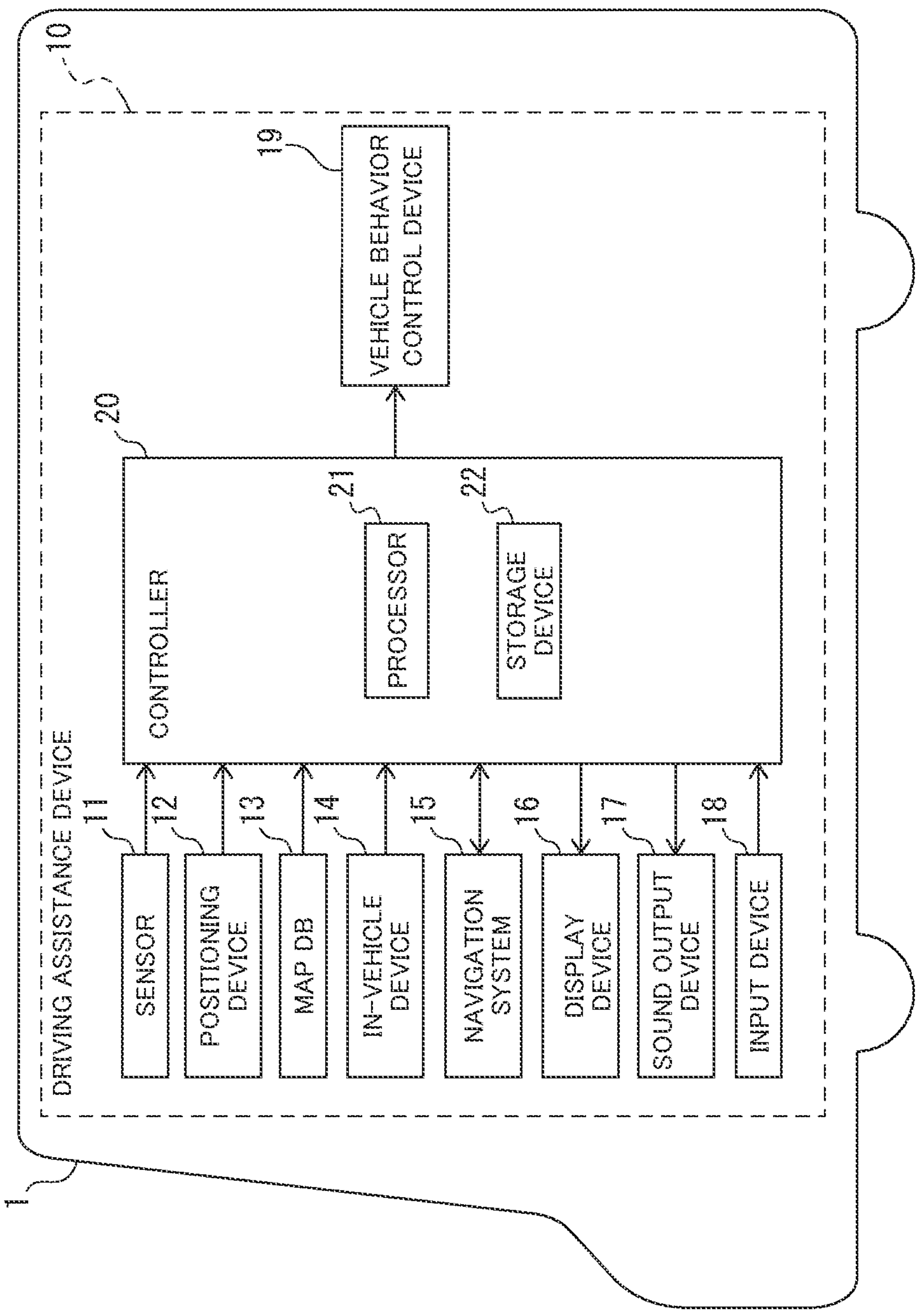
FIG. 1 is a diagram illustrative of an example of a schematic configuration of a vehicle on which a driving assistance device of an embodiment is mounted.

FIG. 1 is a diagram illustrative of an example of a schematic configuration of a vehicle on which a driving assistance device of an embodiment is mounted. A driving assistance device 10 mounted on a vehicle 1 includes a sensor 11, a positioning device 12, a map database (map DB) 13, an in-vehicle device 14, a navigation system 15, a display device 16, a sound output device 17, an input device 18, a vehicle behavior control device 19, and a controller 20. The above-described devices are connected to one another via, for example, a controller area network (CAN) or another in-vehicle LAN in order to perform transmission and reception of information with one another.

The sensor 11 detects a travel state of the vehicle 1. For example, the sensor 11 includes cameras, such as a front view camera for capturing a front view of the vehicle 1, a rear view camera for capturing a rear view of the vehicle 1, and side view cameras for capturing right and left side views of the vehicle 1. In addition, the sensor 11 includes radars, such as a front radar for detecting an obstacle in front of the vehicle 1, a rear radar for detecting an obstacle in the rear of the vehicle 1, and side radars for detecting an obstacle existing on the right and left lateral sides of the vehicle 1. Further, the sensor 11 includes a vehicle speed sensor for detecting vehicle speed of the vehicle 1, a touch sensor (capacitance sensor) for detecting holding of a steering wheel by a passenger (for example, a driver), an in-vehicle camera for imaging the passenger, and the like.

The positioning device 12 includes a GPS unit, a gyro sensor, a vehicle speed sensor, and the like. The positioning device 12 detects radio waves transmitted from a plurality of satellites by the GPS unit and periodically acquires position information of the vehicle 1. In addition, the positioning device 12 detects a current position of the vehicle 1, based on acquired position information of the vehicle 1, angle change information acquired from the gyro sensor, and vehicle speed acquired from the vehicle speed sensor.

The map database 13 is a memory that stores three-dimensional high-definition map information including position information of various types of facilities and specific points and is configured to be accessible from the controller 20. The three-dimensional high-definition map information is three-dimensional map information based on road shapes detected when a vehicle for data acquisition traveled on actual roads. The three-dimensional high-definition map information is map information in which detailed and highly precise position information of a curved road and the amount of curvature (for example, curvature or radius of curvature) of the road, a junction of roads, a branch point, a tollgate, a point of reduction in the number of lanes, and the like is associated with map information as three-dimensional information.

The in-vehicle device 14 is various types of devices mounted on the vehicle 1 and operates in accordance with an operation by the passenger. Examples of such an in-vehicle device include a steering wheel, an accelerator pedal, a brake pedal, turn signals, windshield wipers, lights, a horn, other specific switches, and the like.

The navigation system 15 acquires or receives current position information of the vehicle 1 from the positioning device 12 and displays map information for navigation on which the position of the vehicle 1 is superimposed on a display or the like. In addition, the navigation system 15 includes a navigation function to, when a destination is set, set a route to the destination and guide the passenger along the set route. The navigation function displays a route on a map on the display and informs the passenger of the route by voice or the like. A route set by the navigation system 15 is also used in a route travel assistance function that the controller 20 includes. The route travel assistance function is a function to cause the vehicle 1 to autonomously travel to a destination, based on a set route.

The display device 16 includes, for example, a display that the navigation system 15 includes, a display incorporated in a rearview mirror, a display incorporated in a meter section, a head-up display projected on a windshield, and the like. The display device 16 notifies the passenger of various types of presented information in accordance with control by the controller 20.

The sound output device 17 is a device to output acoustic information, such as a speaker that the navigation system 15 includes, a speaker of an audio device, and a buzzer. The sound output device 17 notifies the passenger of various types of presented information in accordance with control by the controller 20.

The input device 18 is a device, such as a button switch that enables the passenger to input an operation by manual operation, a touch panel arranged on a display screen, and a microphone that enables the passenger to input an operation by voice. The passenger, by operating the input device 18, is able to input setting information in response to presented information presented by the display device 16 and the sound output device 17.

Figure 2:
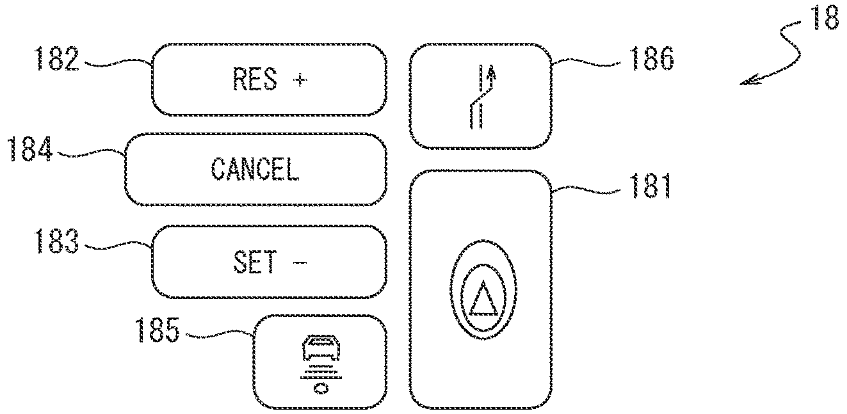
FIG. 2 is a diagram illustrative of a portion of an input device in FIG. 1.

FIG. 2 is a diagram illustrative of a portion of the input device 18 of the present embodiment. The input device 18 may be a button switch group that is arranged on, for example, a spoke of the steering wheel. The input device 18 is used when turning on and off and the like of an autonomous travel control function that the controller 20 includes are set. The input device 18 includes a main switch 181, a resume/accelerate switch 182, a set/coast switch 183, a cancel switch 184, an inter-vehicle distance adjustment switch 185, and a lane change assistance switch 186.

The main switch 181 is a switch to turn on and off the autonomous travel control function of the controller 20. The resume/accelerate switch 182 is a switch to, after the autonomous travel control function is turned off, set resumption of the autonomous travel control function at a set speed before the turning-off of the autonomous travel control function or to increase the set speed. The set/coast switch 183 is a switch to start the autonomous travel control function. In order to start the autonomous travel control function, after the autonomous travel control function is turned on by the main switch 181, the set/coast switch 183 is pressed. The set/coast switch 183 is also a switch to decrease the set speed. The cancel switch 184 is a switch to cancel the autonomous travel control function. The inter-vehicle distance adjustment switch 185 is a switch to set an inter-vehicle distance to a preceding vehicle. The lane change assistance switch 186 is a switch to, when the controller 20 confirms start of a lane change to the passenger, instruct (accept) the start of the lane change.

Note that, in addition to the button switch group illustrated in FIG. 2, a turn signal lever for the turn signals and a switch of another type of in-vehicle device 14 can be used as the input device 18. For example, when the passenger operates the turn signal lever in the case where whether or not a lane change is performed in an automated manner is proposed by the controller 20, a lane change in a direction in which the turn signal lever is operated is performed instead of the proposed lane change.

The vehicle behavior control device 19 controls vehicle behavior of the vehicle 1. For example, when the vehicle 1 performs constant speed travel at a set speed by the autonomous travel control function, the vehicle behavior control device 19 controls operation of a drive mechanism and brake operation to achieve acceleration/deceleration and travel speed that enable the vehicle 1 to travel at the set speed. In addition, when the vehicle 1 travels following a preceding vehicle by the autonomous travel control function, the vehicle behavior control device 19 also likewise controls the operation of the drive mechanism and the brake. Note that the operation control of the drive mechanism includes operation of an internal-combustion engine in the case of an engine-driven vehicle and operation of a motor for traveling in the case of an electric vehicle. In addition, the operation control of the drive mechanism includes torque distribution between an internal-combustion engine and a motor for traveling in the case of a hybrid vehicle.

In addition, when the vehicle behavior control device 19 performs lane-keeping control, a lane change assistance function, a passing assistance function, or a route travel assistance function, which will be described later, by the autonomous travel control function, the vehicle behavior control device 19 performs, in addition to the operation control of the drive mechanism and the brake, steering control of the vehicle 1 by controlling operation of a steering actuator.

The controller 20 is one or a plurality of electronic control units (ECUs) for controlling travel of the vehicle 1 and includes a processor 21 and peripheral components, such as a storage device 22. The processor 21 may be, for example, a central processing unit (CPU) or a micro-processing unit (MPU). The storage device 22 may include a semiconductor storage device, a magnetic storage device, an optical storage device, and the like. The storage device 22 may include registers, a cache memory, and a memory, such as a read only memory (ROM) and a random access memory (RAM), that are used as main storage devices.

Functions of the controller 20, which will be described below, are achieved by, for example, the processor 21 executing computer programs stored in the storage device 22.

Note that the controller 20 may be formed using dedicated hardware for performing various types of information processing that will be described below. For example, the controller 20 may include a functional logic circuit that is implemented in a general-purpose semiconductor integrated circuit. For example, the controller 20 may include a programmable logic device (PLD), such as a field-programmable gate array (FPGA), and the like.

The controller 20 achieves a travel information acquisition function to acquire information relating to a travel state of the vehicle 1 and an autonomous travel control function to autonomously control travel speed and/or steering of the vehicle 1. The travel information acquisition function of the controller 20 is a function to acquire travel information relating to a travel state of the vehicle 1. For example, the controller 20 may acquire, as the travel information, image information of the outside of the vehicle captured by the front view camera, the rear view camera, and the side view cameras in the sensor 11. In addition, the controller 20 acquires, as the travel information, detection results by the front radar, the rear radar, and the side radars. Further, the controller 20 also acquires, as the travel information, vehicle speed information of the vehicle 1 detected by the vehicle speed sensor in the sensor 11 and image information of the face of the passenger captured by the in-vehicle camera.

Further, the controller 20 acquires, as the travel information, the current position information of the vehicle 1 from the positioning device 12. In addition, the controller 20 acquires, as the travel information, a set destination and a route to the destination from the navigation system 15. Further, the controller 20 acquires, as the travel information, position information of a curved road and the amount of curvature (for example, curvature or radius of curvature) of the road, a junction of roads, a branch point, a tollgate, a point of reduction in the number of lanes, and the like from the map database 13. Moreover, the controller 20 acquires, as the travel information, information about operation of the in-vehicle device 14 by the passenger from the in-vehicle device 14.

The autonomous travel control function of the controller 20 is a function to autonomously control travel of the vehicle 1 without depending on operation by the passenger. The autonomous travel control function of the controller 20 include an autonomous speed control function to autonomously control travel speed of the vehicle 1 and an autonomous steering control function to autonomously control steering of the vehicle 1. The autonomous speed control function and the autonomous steering control function of the present embodiment will be described below.

<Autonomous Speed Control Function>

The autonomous speed control function is a function to, when a preceding vehicle is detected, control the vehicle 1 to travel following the preceding vehicle while performing inter-vehicle distance control in such a way as to keep an inter-vehicle distance matching vehicle speed with a vehicle speed set by the passenger as an upper limit. In contrast, when no preceding vehicle is detected, the autonomous speed control function controls the vehicle 1 to perform constant speed travel at a vehicle speed set by the passenger. The former and the latter are also referred to as inter-vehicle distance control and constant speed control, respectively.

Note that the autonomous speed control function may include a function to detect a speed limit of a road on which the vehicle 1 is traveling from a road sign by the sensor 11 or acquire a speed limit from the map information in the map database 13 and automatically set the speed limit as a set vehicle speed.

The constant speed control is performed when it is detected by the front radar or the like in the sensor 11 that no preceding vehicle exists ahead in an own lane of the vehicle 1. In the constant speed control, the vehicle behavior control device 19 controls operation of the drive mechanism, such as the engine and the brake, in such a manner as to maintain a set traveling speed while feeding back vehicle speed data detected by the vehicle speed sensor.

The inter-vehicle distance control is performed when it is detected by the front radar or the like in the sensor 11 that a preceding vehicle exists ahead in the own lane of the vehicle 1. In the inter-vehicle distance control, the vehicle behavior control device 19 controls operation of the drive mechanism, such as the engine and the brake, in such a manner as to maintain a set inter-vehicle distance with a set travel speed as an upper limit while feeding back inter-vehicle distance data detected by the front radar.

<Autonomous Steering Control Function>

The autonomous steering control function is a function to perform the steering control of the vehicle 1 by controlling operation of the steering actuator.

The autonomous steering control function includes, for example, the lane-keeping function, the lane change assistance function, the passing assistance function, and the route travel assistance function.

The lane-keeping function is a function to assist steering of the passenger by controlling the steering actuator in such a way that, for example, the vehicle 1 travels along substantially the center of a lane.

When the set/coast switch 183 is pressed after the autonomous travel control function is turned on by the main switch 181, the controller 20 determines whether or not a predetermined autonomous travel control start condition is established. When the controller 20 determines that the autonomous travel control start condition is established, the controller 20 performs the lane-keeping function in the autonomous steering control function.

Alternatively, when the autonomous travel control start condition is established after the autonomous travel control function is turned on by the main switch 181, the controller 20 waits for the set/coast switch 183 to be pressed. When the set/coast switch 183 is pressed, the controller 20 starts the autonomous travel control and performs the lane-keeping function in the autonomous steering control function.

<Lane Change Assistance Function>

The lane change assistance function starts lane change operation that is a series of processing for automated lane change when the passenger operates the turn signal lever to turn on a turn signal and a predetermined lane change start condition is satisfied. The lane change assistance function determines whether or not the predetermined lane change start condition is established, based on various types of travel information acquired by the travel information acquisition function.

The lane change assistance function starts the lane change operation when the lane change start condition is satisfied. The lane change operation causes the vehicle 1 to laterally move to an adjacent lane and, when the movement to the adjacent lane is finished, turns off the turn signal and starts performance of the lane-keeping function in the adjacent lane.

<Passing Assistance Function>

When a preceding vehicle that is slower than the vehicle 1 exists ahead in the own lane of the vehicle 1 and a predetermined passing proposition condition is satisfied, the passing assistance function presents passing information to the passenger by the display device 16. In this configuration, the passing information is information for proposing passing the preceding vehicle to the passenger. The passing assistance function turns on a turn signal and starts the above-described lane change operation when the passenger accepts the passing by operating the lane change assistance switch 186 in the input device 18 in response to the presentation of the passing information and a preset passing start condition is satisfied. The passing assistance function determines whether or not the passing proposition condition and the passing start condition are established, based on various types of travel information acquired by the travel information acquisition function.

<Route Travel Assistance Function>

When a travel direction change point, such as a branch point, a junction, an exit, and a tollgate, exists in a set route, distance to the travel direction change point is within a predetermined distance, and a predetermined route travel proposition condition is satisfied, the route travel assistance function presents route travel information by the display device 16 and proposes a lane change toward the travel direction change point. In addition, the route travel assistance function starts lane change operation when the proposition of lane change is accepted by an operation of the lane change assistance switch 186 and a predetermined route travel start condition is satisfied.

The route travel assistance function determines whether or not the route travel proposition condition and the route travel start condition are established, based on various types of travel information acquired by the travel information acquisition function.

In the route travel assistance function, there are some cases where when a road on which the vehicle 1 is traveling includes three or more lanes, multiple lane changes are successively performed. When a travel lane of the vehicle 1 before a lane change is proposed is referred to as "own lane", there is a case where the vehicle 1 performs a first lane change from the own lane to an adjacent lane of the own lane and performs a second lane change from the adjacent lane to further adjacent lane on the opposite side of the adjacent lane to the own lane. Hereinafter, a final destination lane of lane changes to which the vehicle 1 is caused to perform the lane changes by the route travel assistance function is referred to as "target lane".

When, in the route travel assistance function, multiple lane changes to be successively performed (hereinafter, simply referred to as "multiple lane changes") are proposed, the passenger can select, as a method for accepting lane changes, a "collective acceptance mode" or an "individual acceptance mode".

In the collective acceptance mode, the passenger collectively accepts multiple lane changes. The controller 20 collectively proposes multiple lane changes before performing a lane change from the own lane to an adjacent lane that is the first lane change included in the multiple lane changes. When the passenger accepts the lane changes by operating the lane change assistance switch 186, the controller 20, without proposing the second or later lane changes included in the multiple lane changes, performs all lane changes included in the multiple lane changes.

In the individual acceptance mode, the passenger individually accepts each lane change included in the multiple lane changes. The controller 20 proposes a lane change every time before starting each lane change included in the multiple lane changes. The passenger accepts each lane change by operating the lane change assistance switch 186.

For example, the passenger can set which of the "collective acceptance mode" and the "individual acceptance mode" is to be selected by operating the navigation system 15.

When the route travel assistance function proposes a lane change, the route travel assistance function displays a lane change image that represents a course of a lane change to be proposed on the display device 16.

Figure 3:
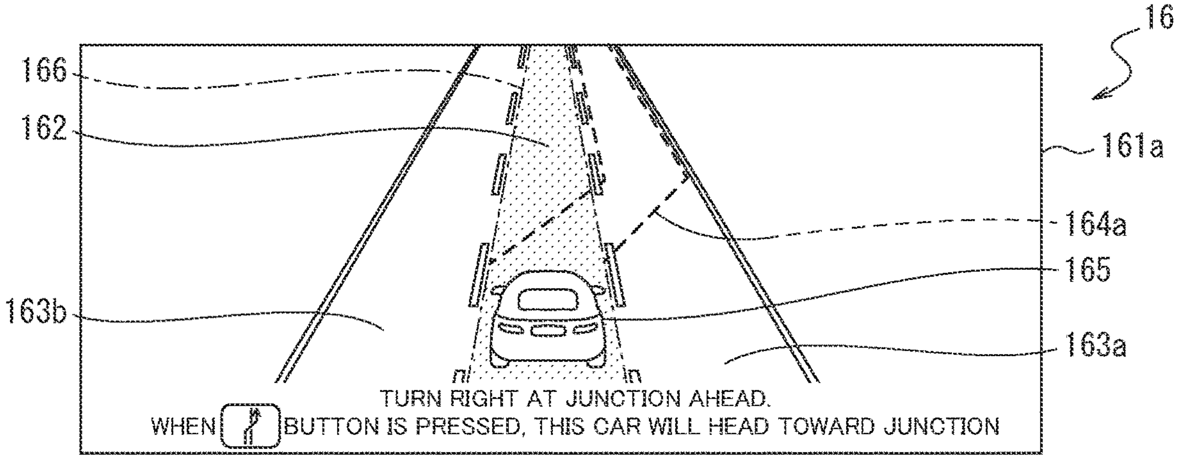
FIG. 3 is a diagram illustrative of a first example of a lane change image displayed while a lane change is proposed.

FIG. 3 illustrates an example of a lane change image when a lane change is proposed in the collective acceptance mode. The display device 16 may display a lane change image 161*a* in a meter section in front of a driver seat. For example, the lane change image 161*a* may be displayed between a speedometer and a tachometer in the meter section. The same applies to lane change images 161*b* and 161*c*, which will be described later. The lane change images 161*a* to 161*c* are collectively referred to as "lane change image 161".

The lane change image 161 includes a road image that represents an own lane 162 that is a lane in which the vehicle 1 is currently traveling and one or more other lanes existing on at least one lateral side of the own lane 162 and including at least adjacent lanes 163*a* and 163*b* that are adjacent to the own lane 162. Other lanes displayed in the lane change image 161 are lanes other than the own lane 162 that have the same travel directions as the own lane 162 and, in the example in FIG. 3, include only the adjacent lanes 163*a* and 163*b*. In the following description, other lanes that are currently displayed in the lane change image 161 are referred to as "displayed other lanes".

Note that when, for example, the vehicle 1, by performing a lane change to the right side, starts traveling in a lane having been displayed as the adjacent lane 163*a*, a lane having been displayed as the adjacent lane 163*a* before the lane change is displayed as the own lane 162 in the lane change images 161.

In addition, when an adjacent lane exists further on the right side of the lane having been displayed as the adjacent lane 163*a* before the lane change, such an adjacent lane, although not having been displayed in the lane change image 161 before the lane change, comes to be displayed as the adjacent lane 163*a* (that is, as a displayed other lane) after the lane change.

Note that the lane change image 161 representing a course of a lane change is displayed only in the route travel assistance function and do not have to be displayed in other functions involving a lane change, for example, the lane change assistance function and the passing assistance function.

FIG. 3 illustrates an example of the lane change image 161*a* in the case where a target lane that is a destination lane of a lane change to which the vehicle 1 is caused to perform a lane change is not a lane on the outer side of the displayed other lanes as viewed from the own lane 162, that is, in the case where the target lane is one of the displayed other lanes. In the example in FIG. 3, the target lane is the adjacent lane 163*a*. In such a case, in the lane change image 161*a*, a course display 164*a* representing a course in which a lane change from the own lane 162 to the target lane 163*a* included in the displayed other lanes is performed is superimposed on the road image.

The course display 164*a* may be a belt-shaped display in which a range on the road surface that the vehicle 1 passes at the time of lane change is schematically displayed as illustrated in, for example, FIG. 3 or a display of an arrow that extends from the own lane 162 to the target lane.

In the lane change image 161, an icon 165 of the vehicle 1 may be superimpose on the road image. The icon 165 of the vehicle 1 may be omitted according to the settings.

In addition, in the lane change image 161 displayed while a lane change is proposed (that is, before start of a lane change), a course display 166 in the case of not performing a lane change may be superimposed on the road image.

Hereinafter, the lane change image 161*a* that is displayed when the target lane is not a lane on the outer side of the displayed other lanes in the collective acceptance mode is sometimes referred to as "first lane change image".

Figure 4:
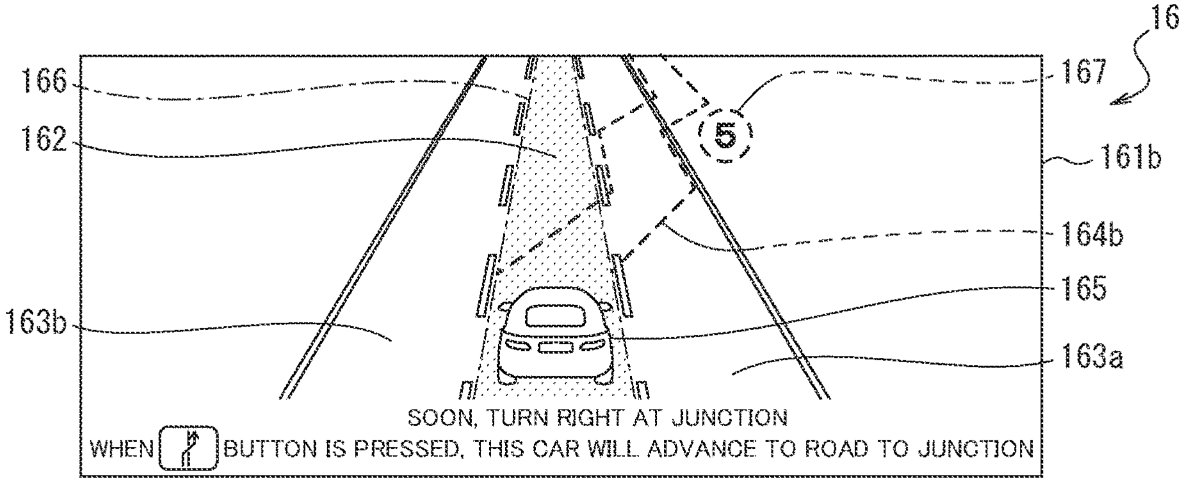
FIG. 4 is a diagram illustrative of a second example of the lane change image displayed while a lane change is proposed.

FIG. 4 illustrates an example of the lane change image 161*b* that is displayed when the target lane is a lane on the outer side of the displayed other lanes as viewed from the own lane 162 (that is, when the target lane is none of the displayed other lanes). In the example in FIG. 4, the target lane is the fifth next lane from the own lane 162 on the right side of the own lane 162.

In such a case, in the lane change image 161*b*, a course display 164*b* representing a course in which a lane change from the own lane 162 to one of the displayed other lanes (in the case of FIG. 4, the adjacent lane 163*a*) is performed and a lane change to the outer side of the displayed other lanes is further performed is superimposed on the road image. The course display 164*b* may be a belt-shaped display in which a range on the road surface that the vehicle 1 passes at the time of lane change is schematically displayed as illustrated in, for example, FIG. 4 or a display of an arrow that starts from the own lane 162, passes the displayed other lanes, and extends to the outer side of the displayed other lanes.

In addition, when the number of lane changes that have not been performed (the number of remaining lane changes) among lane changes proposed by the route travel assistance function is two or more, a numeral 167 indicating the number of remaining lane changes may be displayed in the lane change image 161*b*.

Hereinafter, the lane change image 161*b* that is displayed when the target lane is a lane on the outer side of the displayed other lanes in the collective acceptance mode is sometimes referred to as "second lane change image".

The number of lanes displayed in the lane change image 161*b* is not limited to three as in the examples in FIGS. 3 and 4. The number of lanes displayed in the lane change image 161*b* may be, for example, two, and the lanes may be a plurality of lanes the number of which is four or more.

Figure 5:
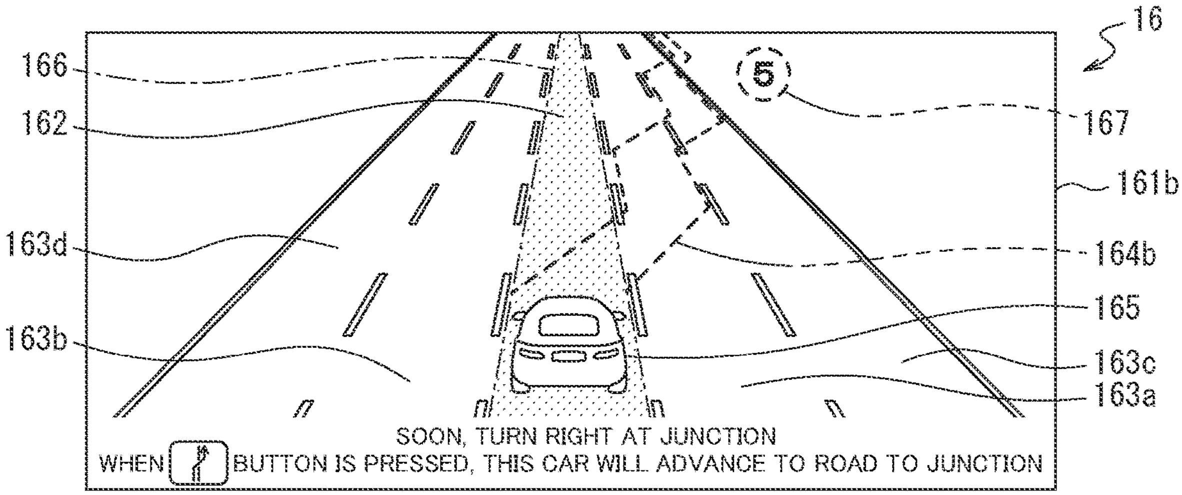
FIG. 5 is a diagram illustrative of a third example of the lane change image displayed while a lane change is proposed.

FIG. 5 illustrates an example of a second lane change image 161*b* in the case where the number of lanes displayed in the lane change image 161*b* is five. In this case, as displayed other lanes 163*a* to 163*d*, the adjacent lanes 163*a* and 163*b* and further adjacent lanes 163*c* and 163*d* of the adjacent lanes 163*a* and 163*b* are displayed.

Therefore, when the target lane that is a destination lane of a lane change to which the vehicle 1 is caused to perform a lane change is the lane 163*c* or 163*d* described above, a first lane change image (not illustrated) in which a course display representing a course in which lane changes from the own lane 162 to the target lane 163*c* or 163*d* are performed is superimposed on the road image is displayed.

Figure 6:
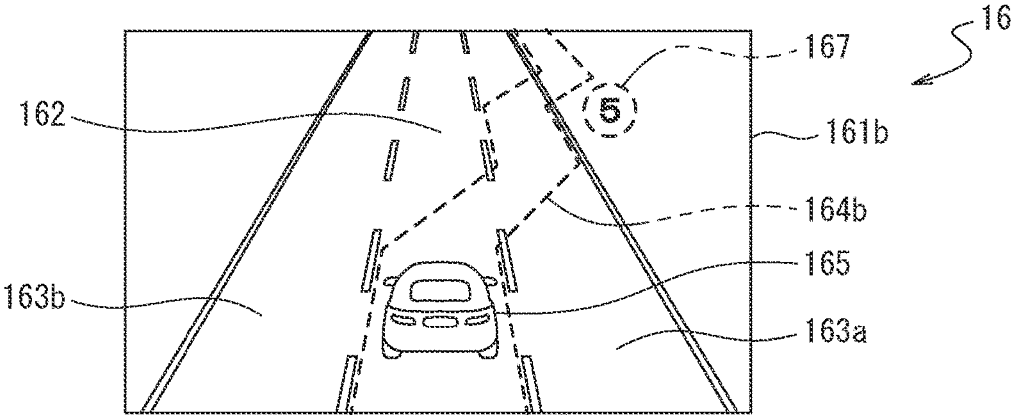
FIG. 6 is a diagram illustrative of a first example of a lane change image displayed after a lane change is started.

FIG. 6 is a diagram illustrative of an example of a second lane change image 161*b* at a time point at which, after the second lane change image 161*b* in FIG. 4 is displayed and a lane change is proposed, the lane change is started. When a lane change by the route travel assistance function is started by the passenger accepting the lane change, the second lane change image 161*b* changes to an image in which the course display 166 in the case where the lane change is not performed is not displayed.

Subsequently, when the lane change is performed, the lane change image is updated in such a way that a lane in which the vehicle 1 travels after the lane change is displayed as the own lane 162. On this occasion, when multiple lane changes are performed, the lane change image is switched every time a single lane change is performed in such a way that a lane in which the vehicle 1 travels after the lane change is displayed as the own lane 162 in turn.

Figure 7:
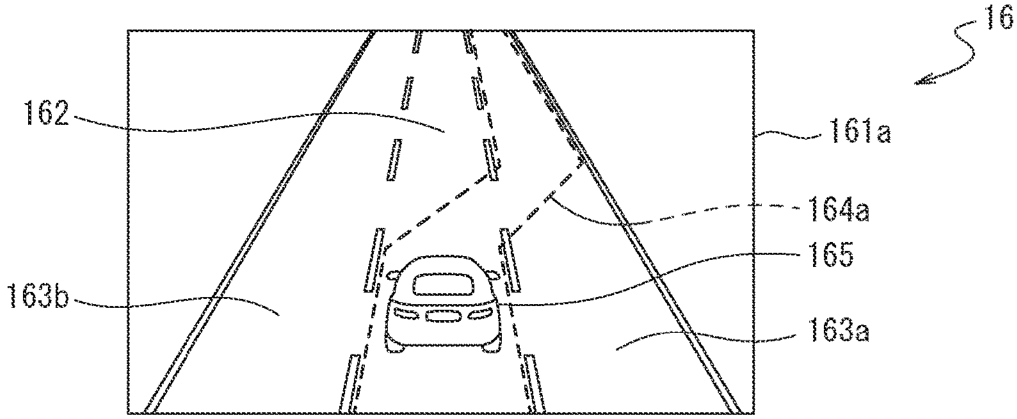
FIG. 7 is a diagram illustrative of a second example of the lane change image displayed after a lane change is started.

When the lane change image is switched every time a single lane change is performed as described above and the number of remaining lane changes among the lane changes proposed by the route travel assistance function becomes one, the lane change image changes to an image illustrated in FIG. 7. That is, when the lane change image is updated and the target lane becomes not a lane on the outer side of the displayed other lanes, the controller 20 changes the lane change image to be displayed on the display device 16 from the second lane change image 161*b* to a first lane change image 161*a* as illustrated in FIG. 7. In the example in FIG. 7, by four lane changes being performed after the second lane change image 161*b* in FIG. 6 is displayed, the target lane is displayed as an adjacent lane 163*a*.

Figure 8:
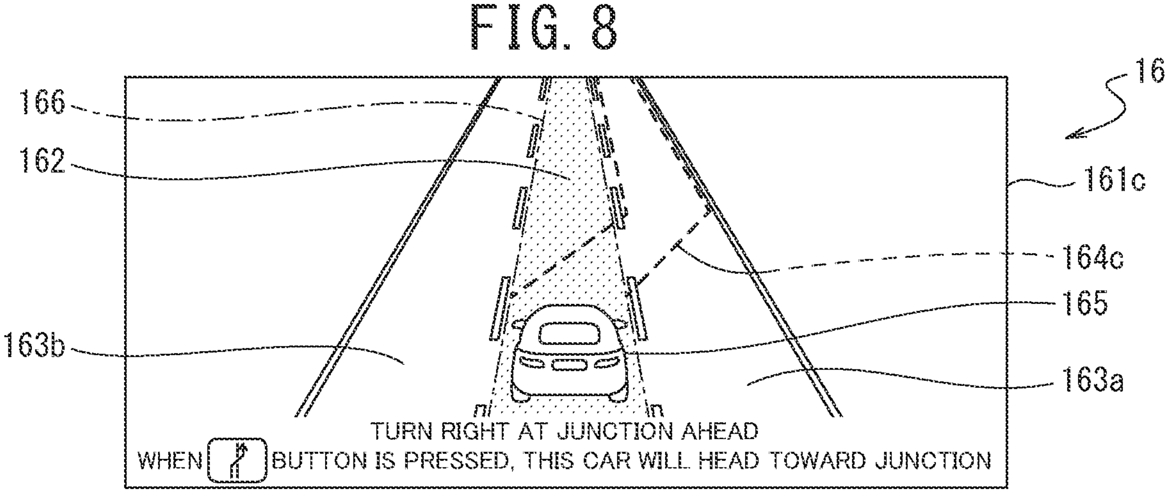
FIG. 8 is a diagram illustrative of a fourth example of the lane change image displayed while a lane change is proposed.

FIG. 8 illustrates an example of a lane change image when a lane change is proposed in the individual acceptance mode. In the individual acceptance mode, regardless of whether or not the target lane is a lane on the outer side of the displayed other lanes as viewed from the own lane 162, a lane change image 161*c* in which a course display representing a course in which a lane change from the own lane 162 to the adjacent lane 163*a* is performed is superimposed on the road image is displayed. The lane change image 161*c* displayed in the individual acceptance mode is sometimes referred to as "third lane change image". In the lane change image 161*c*, a course display 164*c* representing a course in which a lane change from the own lane 162 to an adjacent lane is performed is superimposed on the road image.

Although, in the example of the third lane change image 161*c* in FIG. 8, the numeral 167 (see FIGS. 3 to 7) indicating the number of lane changes that have not been performed (the number of remaining lane changes) among lane changes proposed by the route travel assistance function is not displayed, such a numeral 167 may be displayed in the third lane change image 161*c*.

(Operation)

Figure 9:
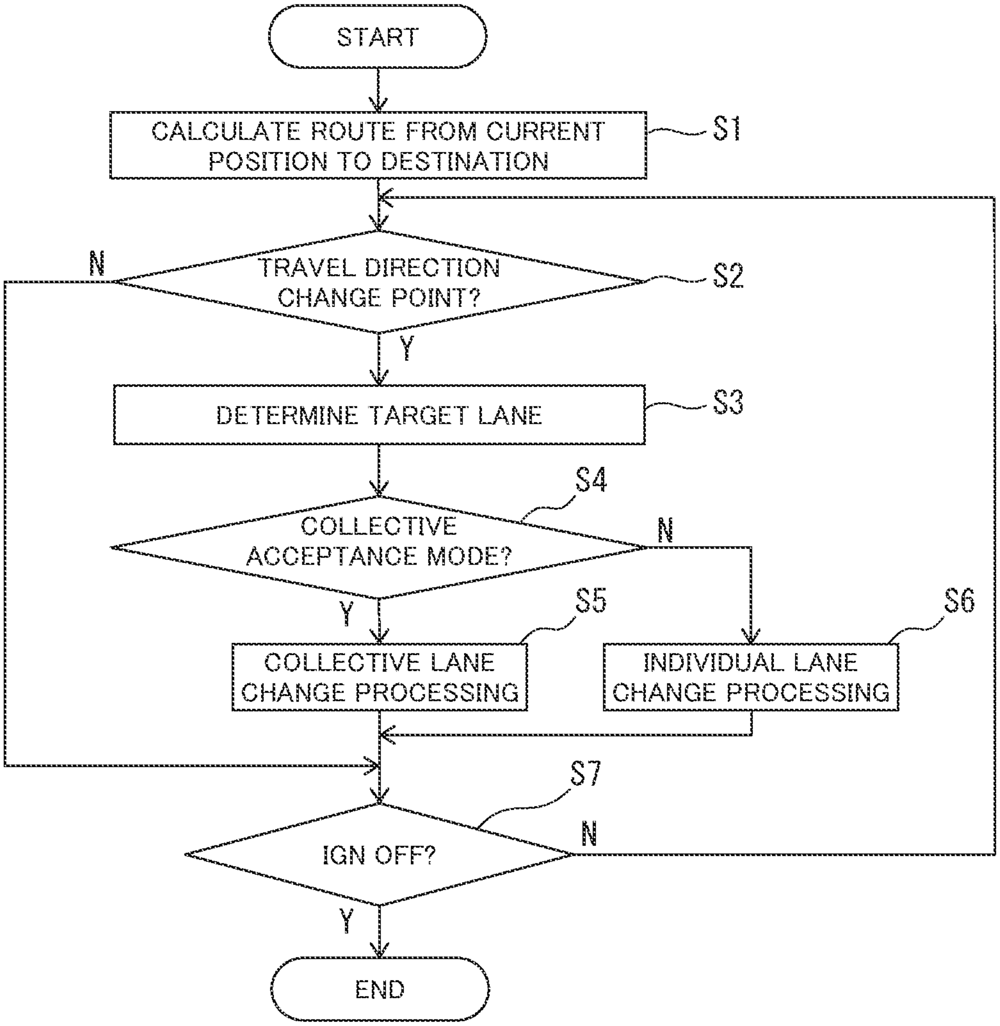
FIG. 9 is a flowchart illustrative of an example of operation of the driving assistance device in FIG. 1.

FIG. 9 is a flowchart illustrative of an example of operation of the driving assistance device 10 of the embodiment.

In step S1, the navigation system 15 calculates a route from the current position of the vehicle 1 to a destination.

In step S2, the controller 20, while performing the route travel assistance function, determines whether or not the vehicle 1 has reached a point at a predetermined distance to a travel direction change point, such as a branch point, existing on the route. When the vehicle 1 has reached a point at a predetermined distance to a travel direction change point (step S2: Y), the process proceeds to step S3. When the vehicle 1 has not reached a point at a predetermined distance to a travel direction change point (step S2: N), the process proceeds to step S7.

In step S3, the controller 20 determines a target lane of a lane change, based on the route calculated in step S1.

In step S4, the controller 20 determines whether an acceptance method of a lane change is set to the collective acceptance mode or the individual acceptance mode. When the acceptance method is set to the collective acceptance mode (step S4: Y), the process proceeds to step S5. When the acceptance method is set to the individual acceptance mode (step S4: N), the process proceeds to step S6.

In step S5, the controller 20 performs collective lane change processing. The collective lane change processing will be described later with reference to FIG. 10. Subsequently, the process proceeds to step S7.

In step S6, the controller 20 performs individual lane change processing. The individual lane change processing will be described later with reference to FIG. 11. Subsequently, the process proceeds to step S7.

In step S7, the controller 20 determines whether or not an ignition key of the vehicle 1 is turned off. When the ignition key has not been turned off (step S7: N), the process returns to step S2. When the ignition key is turned off (step S7: Y), the process terminates.

Next, an example of the collective lane change processing will be described with reference to FIG. 10.

In step S10, the controller 20 determines whether or not the target lane is a lane on the outer side of displayed other lanes as viewed from an own lane. When the target lane is not a lane on the outer side of the displayed other lanes (step S10: N), the process proceeds to step S11. When the target lane is a lane on the outer side of the displayed other lanes (step S10: Y), the process proceeds to step S12.

In step S11, the controller 20 displays a first lane change image 161*a* on the display device 16 and proposes a lane change to the target lane. Subsequently, the process proceeds to step S13.

In step S12, the controller 20 displays a second lane change image 161*b* on the display device 16 and proposes a lane change to the target lane. Subsequently, the process proceeds to step S13.

In step S13, the controller 20 determines whether or not the proposed lane change is accepted by a passenger. When the lane change is accepted (step S13: Y), the process proceeds to step S14. When the lane change is not accepted (step S13: N), the controller 20 terminates the collective lane change processing.

In step S14, the controller 20 performs a single lane change from the own lane in which the vehicle 1 is currently traveling to an adjacent lane.

In step S15, the controller 20 determines whether or not all lane changes are finished (that is, whether or not the vehicle 1 has reached the target lane). When all the lane changes are finished (step S15: Y), the controller 20 terminates the collective lane change processing.

When all the lane changes have not been finished (step S15: N), the process proceeds to step S16 in order to update the lane change image 161 and display a travel lane of the vehicle 1 after lane change as the own lane 162.

In step S16, the controller 20 determines whether or not the target lane is a lane on the outer side of the displayed other lanes as viewed from the own lane. When the target lane is not a lane on the outer side of the displayed other lanes (step S16: N), the process proceeds to step S17. When the target lane is a lane on the outer side of the displayed other lanes (step S16: Y), the process proceeds to step S18.

In step S17, the controller 20 displays a first lane change image 161*a* on the display device 16. Subsequently, the process returns to step S14.

In step S18, the controller 20 displays a second lane change image 161*b* on the display device 16. Subsequently, the process returns to step S14.

Next, an example of the individual lane change processing will be described with reference to FIG. 11.

In step S20, the controller 20 displays a third lane change image 161*c* on the display device 16 and proposes a lane change to an adjacent lane.

In step S21, the controller 20 determines whether or not the received proposed lane change is accepted by the passenger. When the lane change is accepted (step S21: Y), the process proceeds to step S22. When the lane change is not accepted (step S21: N), the controller 20 terminates the individual lane change processing.

In step S22, the controller 20 performs a single lane change from the own lane in which the vehicle 1 is currently traveling to the adjacent lane.

In step S23, the controller 20 determines whether or not all lane changes are finished (that is, whether or not the vehicle 1 has reached the target lane). When all the lane changes have not been finished (step S23: N), the process proceeds to step S20 in order to update the lane change image 161*c* and display a travel lane of the vehicle 1 after lane change as the own lane 162. When all the lane changes are finished (step S23: Y), the controller 20 terminates the individual lane change processing.

Advantageous Effects of Embodiment (1) The controller 20 executes processing including: generating a road image representing an own lane that is a lane in which the vehicle 1 travels and one or more other lanes existing on at least one lateral side of the own lane and including at least an adjacent lane that is adjacent to the own lane; generating a lane change image by, in the case where when the vehicle 1 is caused to perform a lane change by the autonomous travel control, a target lane that is a destination lane of the lane change is determined to be one of displayed other lanes that are the other lanes displayed in the road image, superimposing a first course display representing a course in which a lane change from the own lane to the target lane included in the displayed other lanes is performed on the road image and, in the case where the target lane is determined to be none of the displayed other lanes, superimposing a second course display representing a course in which a lane change from the own lane to one of the displayed other lanes is performed and a lane change to the outer side of the displayed other lane is further performed on the road image; and displaying the lane change image on the display device 16.

Because of this configuration, when the vehicle 1 is caused to perform a lane change by the autonomous travel control, it is possible to, before the lane change is started, inform the passenger of whether a lane change to one of the displayed other lanes (for example, an adjacent lane) displayed on the display device 16 is to be performed or another lane change further continues.

The display device in JP 2018-079202 A described above can display only a lane change from the own lane to an adjacent lane even when multiple lane changes are successively performed. In contrast, the driving assistance device 10 of the embodiment is capable of displaying, on the display device 16, whether, by a lane change performed by the autonomous travel control, the vehicle 1 performs a lane change to one of the displayed other lanes displayed on the display device 16 or performs a lane change to the outer side of the displayed other lanes. That is, it is possible to cause details of control performed by the autonomous travel control and a display on the display device 16 to coincide with each other. Because of this capability, presentation of information relating to the autonomous travel control to the passenger can be improved.

(2) The controller 20 may determine a target lane, based on a target route (route) from the current position of the vehicle 1 to a destination. This configuration enables a lane change for causing the vehicle 1 to travel along the target route.

(3) The lane change to a target lane may include multiple lane changes that are successively performed, and the first lane change included in the multiple lane changes may be a lane change from the own lane to an adjacent lane. The controller 20 may display a lane change image before the first lane change is performed. Because of this configuration, it is possible to, before the first lane change is performed, present whether, by multiple lane changes that are successively performed, a lane change to one of the displayed other lanes is performed or a lane change to the outer side of the displayed other lanes is performed to the passenger.

(4) The navigation system 15 or the controller 20 may store a setting by the passenger for selecting one of the collective acceptance mode in which multiple lane changes are collectively accepted and the individual acceptance mode in which multiple lane changes are individually accepted.

The controller 20 may, when the collective acceptance mode is set, display a lane change image on which the first course display or the second course display is superimposed and, when the individual acceptance mode is set, before the first lane change is performed, display a lane change image in which a third course display representing a course in which a lane change from the own lane to an adjacent lane is performed is superimposed on the road image.

Because of this configuration, it is possible to cause a range of lane change that are performed based on a single acceptance action (that is, a range of control that the autonomous travel control performs based on a single acceptance action) and a display on the display device 16 to coincide with each other according to which of the collective acceptance mode and the individual acceptance mode is set. Because of this capability, presentation of information relating to the autonomous travel control to the passenger can be improved.

(5) The controller 20 may display a numeral indicating the number of remaining lane changes among multiple lane changes in the lane change image. Because of this configuration, even when the target lane is a lane on the outer side of the displayed other lanes as viewed from the own lane, it is possible to present how may lane changes are to be performed to the passenger.

(6) When a lane change is performed after a lane change image in which the second course display is superimposed on the road image is displayed and the target lane becomes one of the displayed other lanes, the controller 20 may display a lane change image in which the first course display is superimposed on the road image. Because of this configuration, it is possible to change the lane change image according to progress of lane changes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Vehicle
10 Driving assistance device
11 Sensor
12 Positioning device
13 Map database
14 In-vehicle device
15 Navigation system
16 Display device
17 Sound output device
18 Input device
19 Vehicle behavior control device
20 Controller
21 Processor
22 Storage device

The invention claimed is:

1. An image control method causing a controller to execute processing comprising:

generating a road image representing an own lane, the own lane being a lane in which an own vehicle travels, and one or more other lanes existing on at least one lateral side of the own lane and including at least an adjacent lane, the adjacent lane being adjacent to the own lane;

when presenting a proposal for a lane change of the own vehicle by autonomous travel control, generating a lane change image by superimposing a first course display representing a course in which a lane change to a target lane is performed on the road image, the target lane being determined as a destination lane of the lane change, or by superimposing a second course display representing a belt-shaped range extending from the own lane through the other lanes displayed in the road image and to an outer side of the other lanes displayed in the road image on the road image; and displaying the lane change image on a display device, wherein a lane change to the target lane includes multiple lane changes successively performed, a first lane change included in the multiple lane changes is a lane change from the own lane to the adjacent lane, and the controller further executes processing including:

storing a setting by a passenger for selecting one of a collective acceptance mode in which proposals for the multiple lane changes are collectively accepted and an individual acceptance mode in which the proposals for the multiple lane changes are individually accepted;

when the collective acceptance mode is set and the target lane is displayed in the road image, before the first lane change is performed, displaying the lane change image on which the first course display is superimposed;

when the collective acceptance mode is set and the target lane is not displayed in the road image, before the first lane change is performed, displaying the lane change image on which the second course display is superimposed;

when the individual acceptance mode is set, before the first lane change is performed, displaying a lane change image in which a third course display representing a course in which a lane change from the own lane to the adjacent lane is performed is superimposed on a road image;

receiving an acceptance input of the proposals of the multiple lane changes; and executing the lane change of the own vehicle to the target lane by autonomous travel control of the own vehicle in response to the received acceptance input.

2. The image control method according to claim 1, wherein the target lane is determined based on a target route from a current position of the own vehicle to a destination.

3. The image control method according to claim 1, wherein the image control method displays a numeral indicating a number of remaining lane changes among the multiple lane changes in the lane change image.

4. The image control method according to claim 1, wherein when a lane change is performed after the lane change image in which the second course display is superimposed on the road image is displayed and the target lane becomes to be displayed in the road image, the image control method displays the lane change image in which the first course display is superimposed on the road image.

5. An image control device comprising a controller configured to execute processing including:

generating a road image representing an own lane, the own lane being a lane in which an own vehicle travels, and one or more other lanes existing on at least one lateral side of the own lane and including at least an adjacent lane, the adjacent lane being adjacent to the own lane;

when presenting a proposal for a lane change of the own vehicle by autonomous travel control, generating a lane change image by superimposing a first course display representing a course in which a lane change to a target lane is performed on the road image, the target lane being determined as a destination lane of the lane change, or by superimposing a second course display representing a belt-shaped range extending from the own lane through the other lanes displayed in the road image and to an outer side of the other lanes displayed in the road image on the road image; and displaying the lane change image on a display device, wherein a lane change to the target lane includes multiple lane changes successively performed, a first lane change included in the multiple lane changes is a lane change from the own lane to the adjacent lane, and the controller further executes processing including:

storing a setting by a passenger for selecting one of a collective acceptance mode in which proposals for the multiple lane changes are collectively accepted and an individual acceptance mode in which the proposals for the multiple lane changes are individually accepted;

when the collective acceptance mode is set and the target lane is displayed in the road image, before the first lane change is performed, displaying the lane change image on which the first course display is superimposed;

when the collective acceptance mode is set and the target lane is not displayed in the road image, before the first lane change is performed, displaying the lane change image on which the second course display is superimposed;

when the individual acceptance mode is set, before the first lane change is performed, displaying a lane change image in which a third course display representing a course in which a lane change from the own lane to the adjacent lane is performed is superimposed on a road image;

receiving an acceptance input of the proposals of the multiple lane changes; and executing the lane change of the own vehicle to the target lane by autonomous travel control of the own vehicle in response to the received acceptance input.

6. An image control method causing a controller to execute processing comprising:

generating a road image representing an own lane, the own lane being a lane in which an own vehicle travels, and one or more other lanes existing on at least one lateral side of the own lane and including at least an adjacent lane, the adjacent lane being adjacent to the own lane;

when presenting a proposal for a lane change of the own vehicle by autonomous travel control, generating a lane change image by superimposing a course display representing a course in which a lane change to a target lane determined as a destination lane of a lane change is performed on the road image;

storing a setting by a passenger for selecting one of a collective acceptance mode in which proposals for multiple lane changes are collectively accepted when a lane change to the target lane includes the multiple lane changes successively performed and an individual acceptance mode in which the proposals for the multiple lane changes are individually accepted;

displaying the lane change image on a display device before lane a change from the own lane to the adjacent lane as a first lane change included in the multiple lane changes;

receiving an acceptance input of the proposals of the multiple lane changes; and executing the lane change of the own vehicle to the target lane by autonomous travel control of the own vehicle in response to the received acceptance input, wherein the lane change image represents a range of lane change that are performed based on a single acceptance action according to which of the collective acceptance mode and the individual acceptance mode is set.

7. An image control device comprising a controller configured to execute processing including:

generating a road image representing an own lane, the own lane being a lane in which an own vehicle travels, and one or more other lanes existing on at least one lateral side of the own lane and including at least an adjacent lane, the adjacent lane being adjacent to the own lane;

when presenting a proposal for a lane change of the own vehicle by autonomous travel control, generating a lane change image by superimposing a course display representing a course in which a lane change to a target lane determined as a destination lane of a lane change is performed on the road image;

storing a setting by a passenger for selecting one of a collective acceptance mode in which proposals for multiple lane changes are collectively accepted when a lane change to the target lane includes the multiple lane changes successively performed and an individual acceptance mode in which the proposals for the multiple lane changes are individually accepted;

displaying the lane change image on a display device before lane a change from the own lane to the adjacent lane as a first lane change included in the multiple lane changes;

receiving an acceptance input of the proposals of the multiple lane changes; and executing the lane change of the own vehicle to the target lane by autonomous travel control of the own vehicle in response to the received acceptance input, wherein the lane change image represents a range of lane change that are performed based on a single acceptance action according to which of the collective acceptance mode and the individual acceptance mode is set.

* * * * *